United States Patent
Ishikawa et al.

(10) Patent No.: US 9,707,685 B2
(45) Date of Patent: Jul. 18, 2017

(54) CONTAINER-CARRYING DEVICE USING ROBOT HAND

(71) Applicant: FANUC CORPORATION, Yamanashi (JP)

(72) Inventors: Takashi Ishikawa, Yamanashi (JP); Masaru Oda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 11 days.

(21) Appl. No.: 14/635,437

(22) Filed: Mar. 2, 2015

(65) Prior Publication Data

US 2015/0251319 A1 Sep. 10, 2015

(30) Foreign Application Priority Data

Mar. 4, 2014 (JP) ................................. 2014-041715

(51) Int. Cl.
*B25J 15/00* (2006.01)
(52) U.S. Cl.
CPC ................................. *B25J 15/0014* (2013.01)
(58) Field of Classification Search
CPC .... B65G 47/901; B65G 61/00; B25J 15/0014; B25J 15/0019; B25J 15/0066; B25J 15/103
See application file for complete search history.

(56) References Cited

U.S. PATENT DOCUMENTS

| 3,289,873 A | * | 12/1966 | Hansen | ................... | B66F 9/148 414/671 |
|---|---|---|---|---|---|
| 2009/0132086 A1 | * | 5/2009 | Hariki | ................. | B25J 15/0253 700/245 |

FOREIGN PATENT DOCUMENTS

| CN | 1490133 A | 4/2004 |
|---|---|---|
| CN | 203006550 U | 6/2013 |
| DE | 4213301 A1 | 10/1993 |
| EP | 2441709 A1 | 4/2012 |
| JP | S62-108333 U | 7/1987 |
| JP | H02-082493 U | 6/1990 |
| JP | H07-069450 A | 3/1995 |
| JP | H10-235588 A | 9/1998 |
| JP | 4615015 B2 | 1/2011 |

OTHER PUBLICATIONS

English Translation of Japanese Publication No. H10-235588, published Sep. 8, 1998, 12 pages.
English Translation of Japanese Publication No. H07-069450, published Mar. 14, 1995, 10 pages.
Partial English Translation of Japanese Publication No. H02-082493, published Jun. 26, 1990, 1 pages.

(Continued)

*Primary Examiner* — Scott Lowe

(74) *Attorney, Agent, or Firm* — Fredrikson & Byron, P.A.

(57) ABSTRACT

A container-carrying device includes: a first slide base unit; a first slide unit; a holding unit; a second slide base unit; a second slide unit; and a receiving unit. The robot is operated to position the holding unit at the upper end of one side unit of the container so that the holding unit holds the upper end, the first slide unit is made to slide upward along the first slide base unit to raise the container. The second slide unit is made to slide along the second slide base unit to insert the receiving unit below the bottom of the container, thereby taking out the container.

5 Claims, 9 Drawing Sheets

(56) References Cited

OTHER PUBLICATIONS

Translated Decision to Grant a Patent for JP Application No. 2014-041715, dated Dec. 1, 2015, 3 pages.
Untranslated Decision to Grant a Patent for JP Application No. 2014-041715, dated Dec. 1, 2015, 3 pages.
Translated Notification of Reasons for Refusal for JP Application No. 2014-041715, dated Aug. 18, 2015, 3 pages.
Untranslated Notification of Reasons for Refusal for JP Application No. 2014-041715, dated Aug. 18, 2015, 3 pages.
English abstract and machine translation for Japanese Publication No. JP 4615015 B2, published Oct. 29, 2010, 21pgs.
English Abstract for Chinese Publication No. 203006550 U, published Jun. 19, 2013, 1 pg.
English Abstract and Machine Translation for Chinese Publication No. 1490133 A, published Apr. 21, 2004, 14 pgs.
English Abstract and Machine Translation for German Publication No. 4213301 A1, published Oct. 28, 1993, 5 pgs.

\* cited by examiner

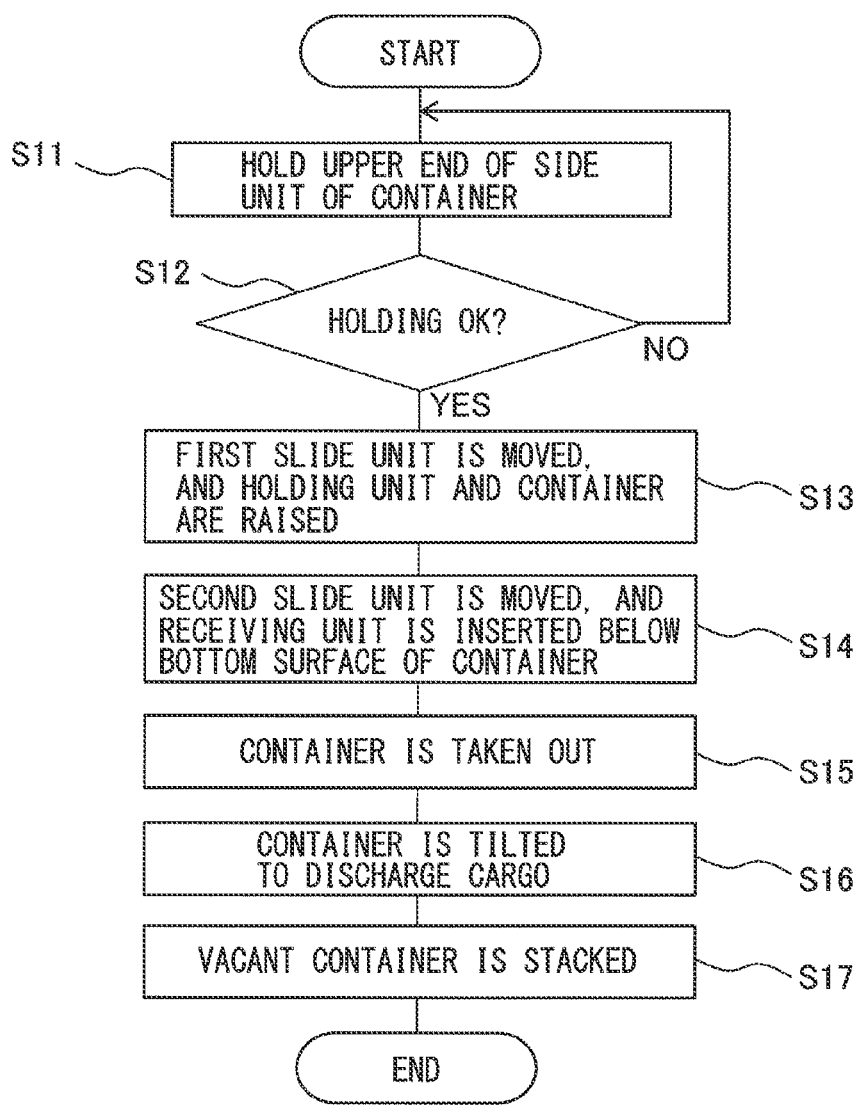

CONTAINER-CARRYING DEVICE USING ROBOT HAND

BACKGROUND OF THE INVENTION

1. Technical Field

The present invention relates to a container-carrying device which carries a top-open box container by a robot hand.

2. Description of Related Art

Top-open box containers load a plurality of parts as cargo. Such a container is carried by a robot. In Japanese Patent No. 4615015, an openable/closable holding unit of a robot hand holds a container on both sides at upper ends thereof to carry the container.

However, in order for an openable/closable holding unit to hold a container, gaps for inserting a holding unit need to be formed on both sides of the container. For this reason, when a plurality of containers are arranged close to each other, such a container cannot be held by using an openable/closable holding unit without a sufficient gap. Thus, a container-carrying device of Japanese Patent No. 4615015 cannot be used for unloading such containers arranged close to each other.

Further, in the configuration of Japanese Patent No. 4615015, an opening of a container is substantially closed since the openable/closable holding unit is positioned above the opening of the container. It is therefore difficult to discharge cargo in the container through the opening even when the container is tilted by a robot hand provided with an openable/closable holding unit.

The present invention has been made in view of such circumstances, and an object of the present invention is to provide a container-carrying device which, even when a plurality of containers are arranged close to each other, can hold and carry such a container.

SUMMARY OF INVENTION

In order to achieve the object described above, according to a first embodiment, there is provided a container-carrying device carrying a top-open box container, comprising: a robot; a base unit attached to an arm tip of the robot; a first slide base unit extending in the vertical direction which is attached to the base unit; a first slide unit slidable along the first slide base unit; a holding unit which is attached to the first slide unit and which holds the upper end of one side of the container; a second slide base unit which is attached to the base unit, which is in parallel to the bottom surface of the container, and which extends perpendicular to the first slide base unit; a second slide unit slidable along the second slide base unit; and a receiving unit which is attached to the second slide unit and which receives the bottom surface of the container, wherein the robot is operated to position the holding unit at the upper end of one side of the container so that the holding unit holds the upper end, the first slide unit is made to slide upward along the first slide base unit to raise the container, and the second slide unit is made to slide along the second slide base unit to insert the receiving unit below the bottom of the container, thereby taking out the container.

According to a second embodiment, in the first aspect, the holding unit holds the container by pinching the inner surface and the outer surface thereof and holding by friction.

According to a third embodiment, in the first aspect, the holding unit comprises: a first holding member which is attached to the first slide unit and which extends to be engaged with the inner surface of the container; a third slide base unit which is attached to the first slide unit or the first holding member and which extends perpendicular to the first slide base unit; a third slide unit slidable along the third slide base unit; and a second holding member which is attached to the third slide unit to be engaged with the outer surface of the container, wherein, after the first holding member is engaged with the inner surface of the container, the third slide unit is made to slide along the third slide base unit to engage the second holding member with the outer surface of the container, thereby holding the container.

According to a fourth embodiment, in the third aspect, a flange unit is formed on the upper end of the one side of the container, the second holding member comprises a protruding unit protruding frontward, after the second holding member is engaged with the outer surface of the container, the first slide unit is made to slide upward along the first slide base unit, whereby the protruding unit of the second holding member supports the bottom surface of the flange unit.

According to a fifth embodiment, in the first aspect, the robot, the base unit, the first slide base unit, the first slide unit, the second slide base unit, the second slide unit, and the receiving unit are arranged outside or below the one side of the container.

These objects, features, and advantages of the present invention and other objects, features, and advantages thereof will be made clearer from the detailed description of a typical embodiment of the present invention shown in the accompanying drawings.

BRIEF DESCRIPTION OF THE DRAWINGS

FIG. 3 is a flow chart illustrating an operation of a container-carrying device according to one embodiment of the present invention.

DETAILED DESCRIPTION

Figure 1:
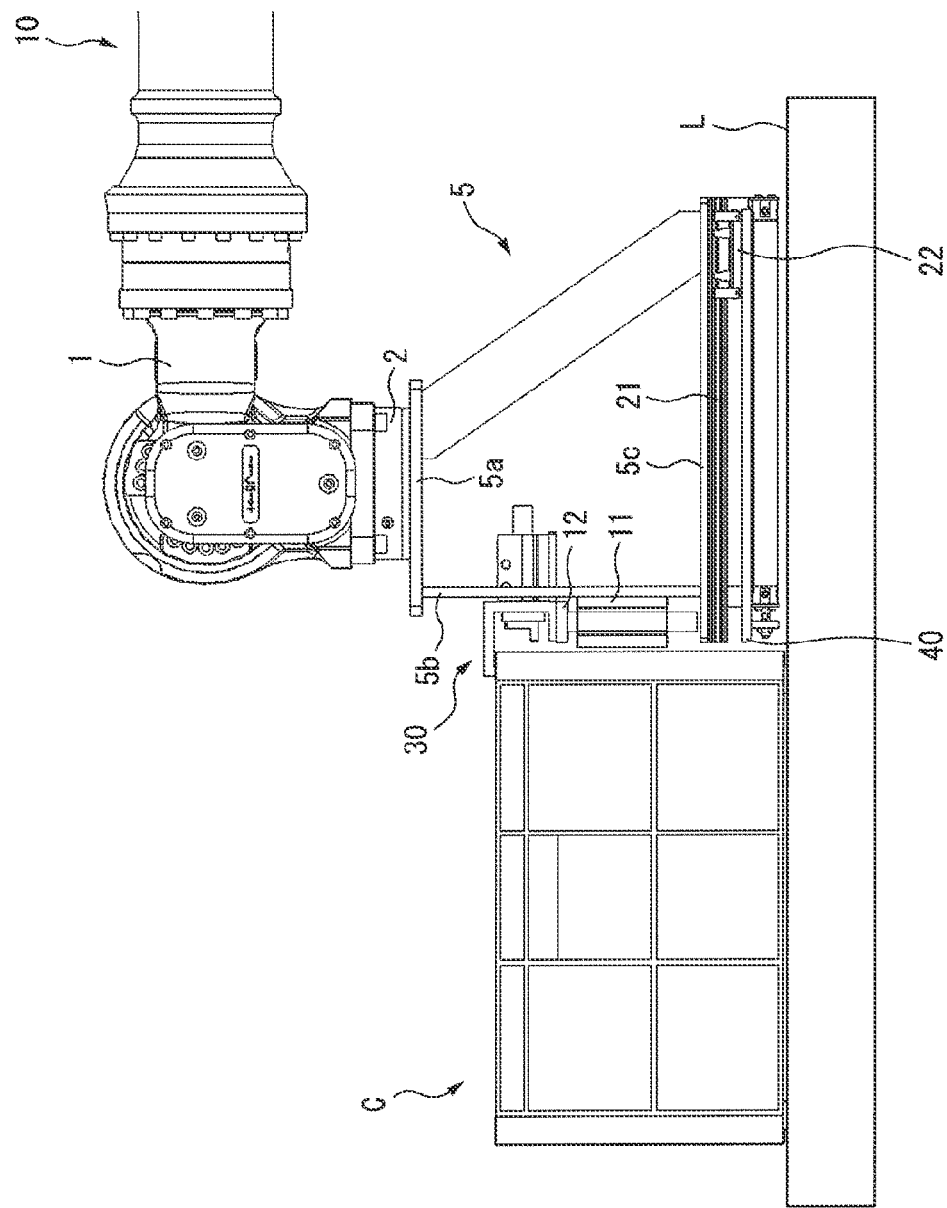
FIG. 1 is a first side view of a container-carrying device according to an embodiment of the present invention.

An embodiment of the present invention will be described below with reference to the accompanying drawings. The same reference numerals in the drawings below denote the same members. For easier understanding, the drawings have been changed in scale as necessary.

FIG. 1 is a first side view of a container-carrying device according to an embodiment of the present invention. As illustrated in FIG. 1, a container-carrying device 10 is used for carrying a top-open box container C. Although, in FIG. 1, the container C is arranged on a floor unit L, cases in which the container C is arranged on another container (not illustrated) are also applicable.

The container-carrying device 10 includes a robot 1 which is, for example, an articulated robot. A base plate 5a of a base unit 5 is attached to an arm tip 2 of the robot 1. In FIG. 1, the base unit 5 is a frame body having a substantially trapezoidal shape provided with two side units orthogonal to each other. The base unit 5 may have any shape as long as it is provided with two side units orthogonal to each other. The base unit 5 and the below-mentioned members attached to the base unit 5 serve as a robot hand.

A first slide base unit 11 is attached to one side unit 5b perpendicular to the base plate 5a. In addition, a first slide unit 12 is slidably attached along the first slide base unit 11. Further, a holding unit 30 mentioned below is connected to the first slide unit 12. The height of the side unit 5b is substantially the same as or longer than the height of the container C.

A second slide base unit 21 is attached to one side unit 5c of the base unit 5 perpendicular to the side unit 5b. In addition, a second slide unit 22 is slidably attached along the second slide base unit 21. Further, a receiving unit 40 is connected to the second slide unit 22. The receiving unit 40 is a member having, for example, a substantially flat plate shape and having a strength and a size sufficient for receiving the bottom of the container C. For example, the area of the receiving unit 40 can be equal to or larger than ½ the area of the bottom surface of the container C. The receiving unit 40 may be a forked member which can support the bottom surface of the container C.

Figure 2A:
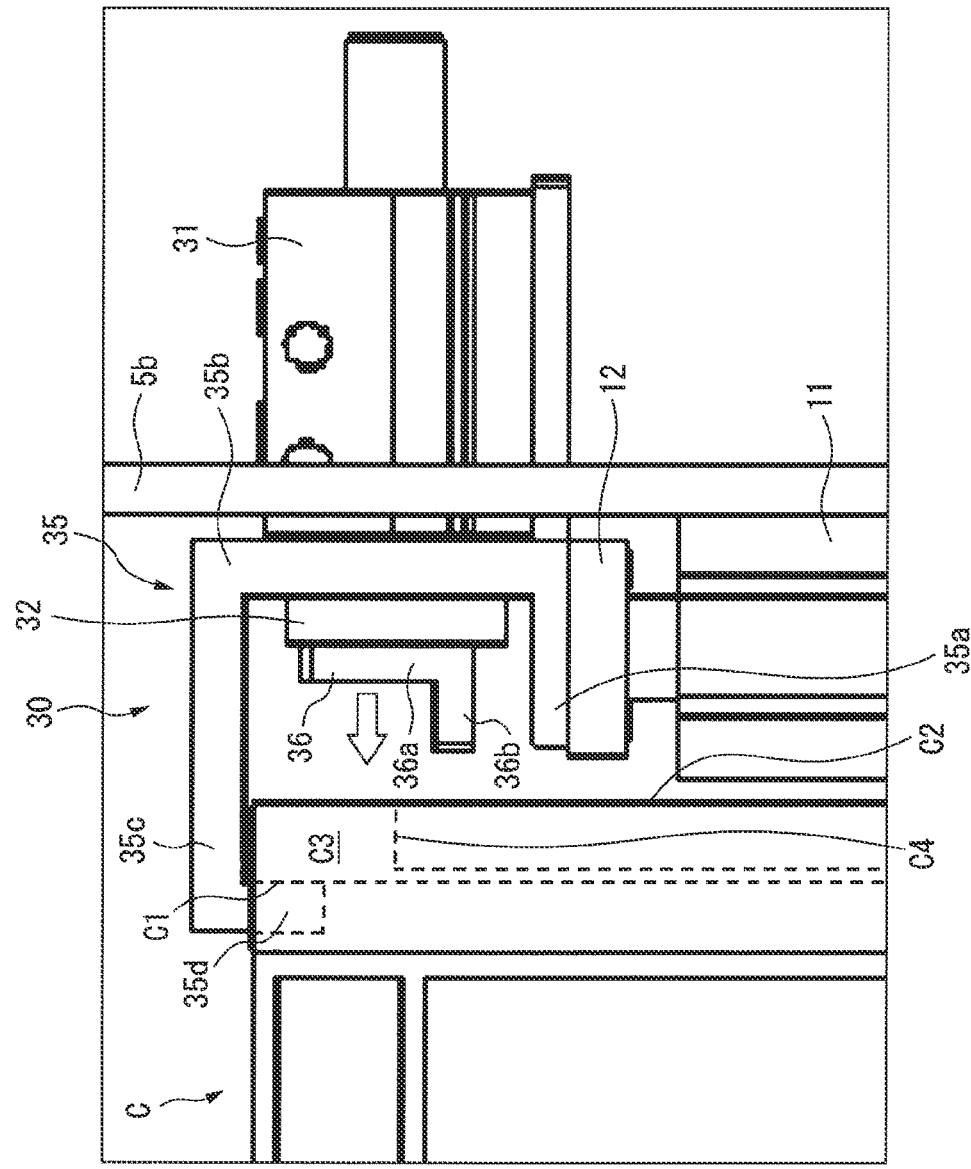
FIG. 2A is a partial enlarged view of a holding unit in FIG. 1.

FIG. 2A is a partial enlarged view of a holding unit in FIG. 1. As illustrated in FIG. 2A, the holding unit 30 comprises a third slide base unit 31 attached to the first slide unit 12 and a third slide unit 32 slidable along the third slide base unit 31. As can be seen from FIG. 2A, the third slide base unit 31 extends perpendicular to the first slide base unit 11.

Further, the holding unit 30 comprises a first holding member 35 attached to the first slide unit 12. The above-mentioned third slide base unit 31 may be attached to the first holding member 35. As illustrated in FIG. 2A, the first holding member 35 has a shape formed by combining two substantially L-shaped members perpendicularly. In other words, the first holding member 35 comprises: a first portion 35a connected to the first slide unit 12; a second portion 35b extending upward perpendicular to the first portion 35a; a third portion 35c extending frontward perpendicular to the second portion 35b and in parallel to the first portion 35a; and a fourth portion 35d extending downward perpendicular to the third portion 35c and in parallel to the second portion 35b.

As illustrated in FIG. 2A, the third portion 35c of the first holding member 35 protrudes frontward beyond the first portion 35a and the first slide unit 12. The distance between the fourth portion 35d and the second portion 35b is thus sufficiently larger than the sum of lengths of the third slide unit 32, the below-mentioned second holding member 36, and a thickness portion of the container C.

In FIG. 2A, the thickness portion of the container C is represented by a portion between an inner surface C1 and an outer surface C2 of the container C. As illustrated in FIG. 2A, a flange unit C3 is formed on the upper end of one side of the container C. The flange unit C3 in FIG. 2A is a solid portion which is created near the upper end of the container C by forming a recess C4 on the outer surface C2 of the container C. Alternatively, the flange unit C3 may be a protrusion (not illustrated) which protrudes from the outer surface C2 of the container C.

Further, the holding unit 30 comprises a second holding member 36 attached to the third slide unit 32. As can be seen from FIG. 2A, the second holding member 36 is a single substantially L-shaped member. The second holding member 36 comprises: a first portion 36a which is connected to the third slide unit 32 and extends in parallel to the first slide base unit 11; and a second portion 36b which is perpendicular to the first portion 36a and extends frontward. As illustrated in FIG. 2A, the vertical length of the flange unit C3 is larger than the distance between the inner surface of the third portion 35c of the first holding member 35 and the upper surface of the second portion 36b of the second holding member 36.

Figure 4:
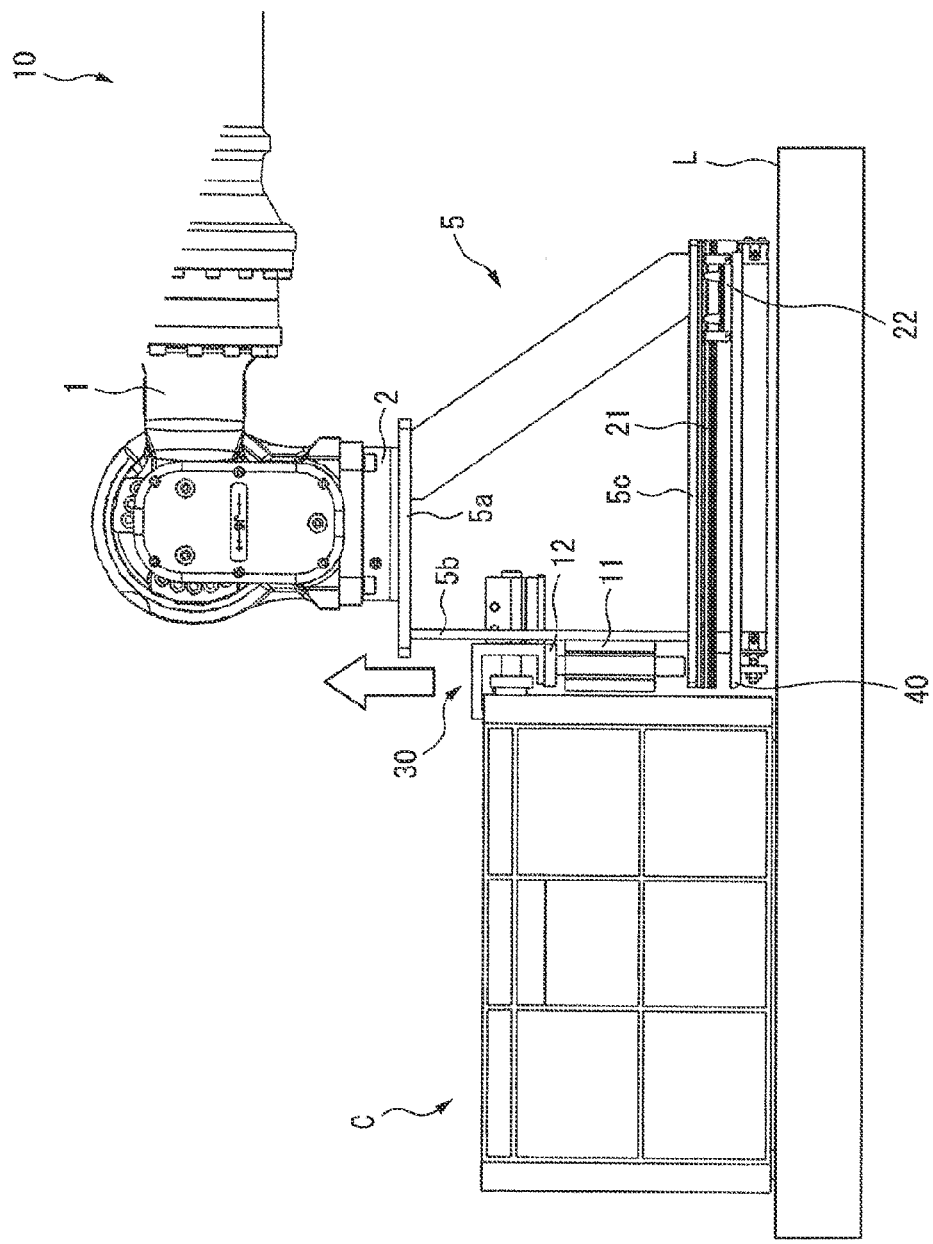
FIG. 4 is a first side view for explaining the operation of a container-carrying device according to one embodiment of the present invention.
Figure 5:
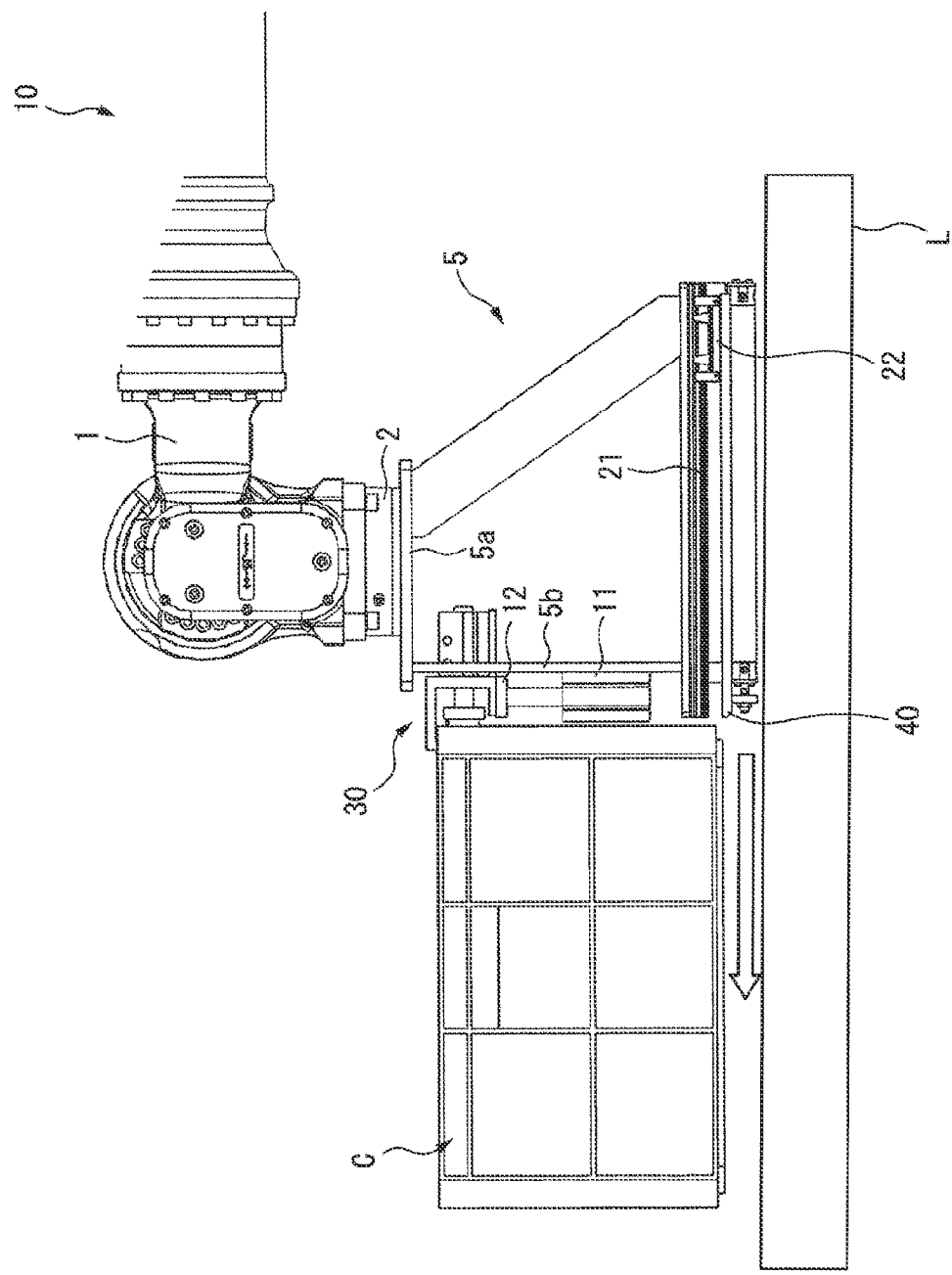
FIG. 5 is a second side view for explaining the operation of a container-carrying device according to one embodiment of the present invention.
Figure 6:
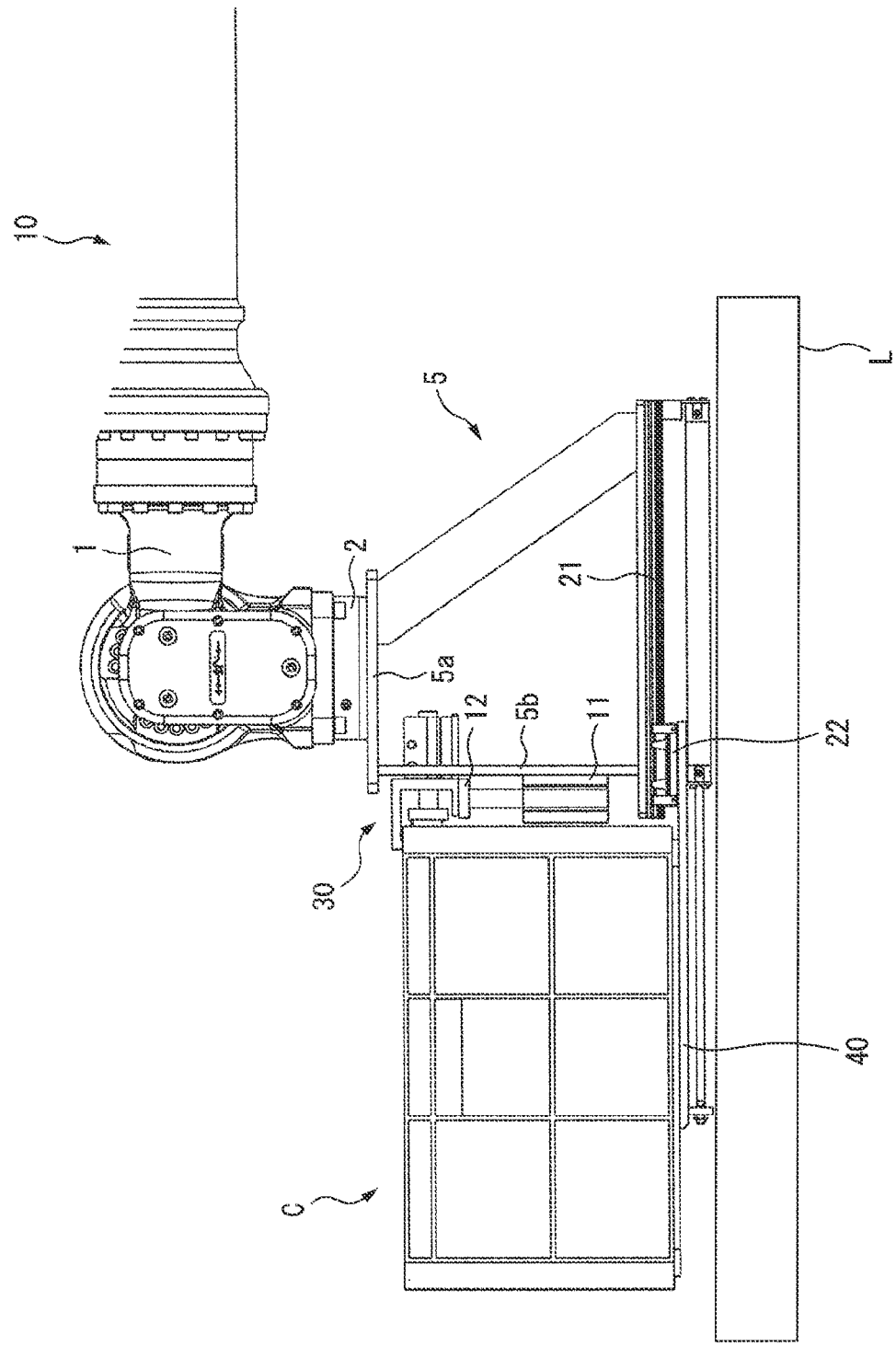
FIG. 6 is a third side view for explaining the operation of a container-carrying device according to one embodiment of the present invention.

FIG. 3 is a flow chart illustrating an operation of a container-carrying device according to one embodiment of the present invention. FIGS. 4 to 6 are side views for illustrating an operation of a container-carrying device according to one embodiment of the present invention. An operation of a container-carrying device 10 according to one embodiment of the present invention will be described with reference to FIGS. 1 to 6.

First, in step S11, the robot 1 is operated to make the base unit 5 adjacent to one side of the container C. Then, the upper end of one side of the container C is held by the holding unit 30.

Specifically, as illustrated in FIG. 2A, the fourth portion 35d of the first holding member 35 is engaged with the inner surface C1 of the container C. Then, the third slide unit 32 is allowed to slide along the third slide base unit 31. Thus, the second holding member 36 moves toward the container C. As the result, the first portion 36a of the second holding member 36 is engaged with the outer surface C2 of the container C, and at the same time, the second portion 36b enters a recess C4 on the outer surface C2 of the container C, so that the second portion 36b is positioned below the bottom surface of the flange unit C3.

Figure 2B:
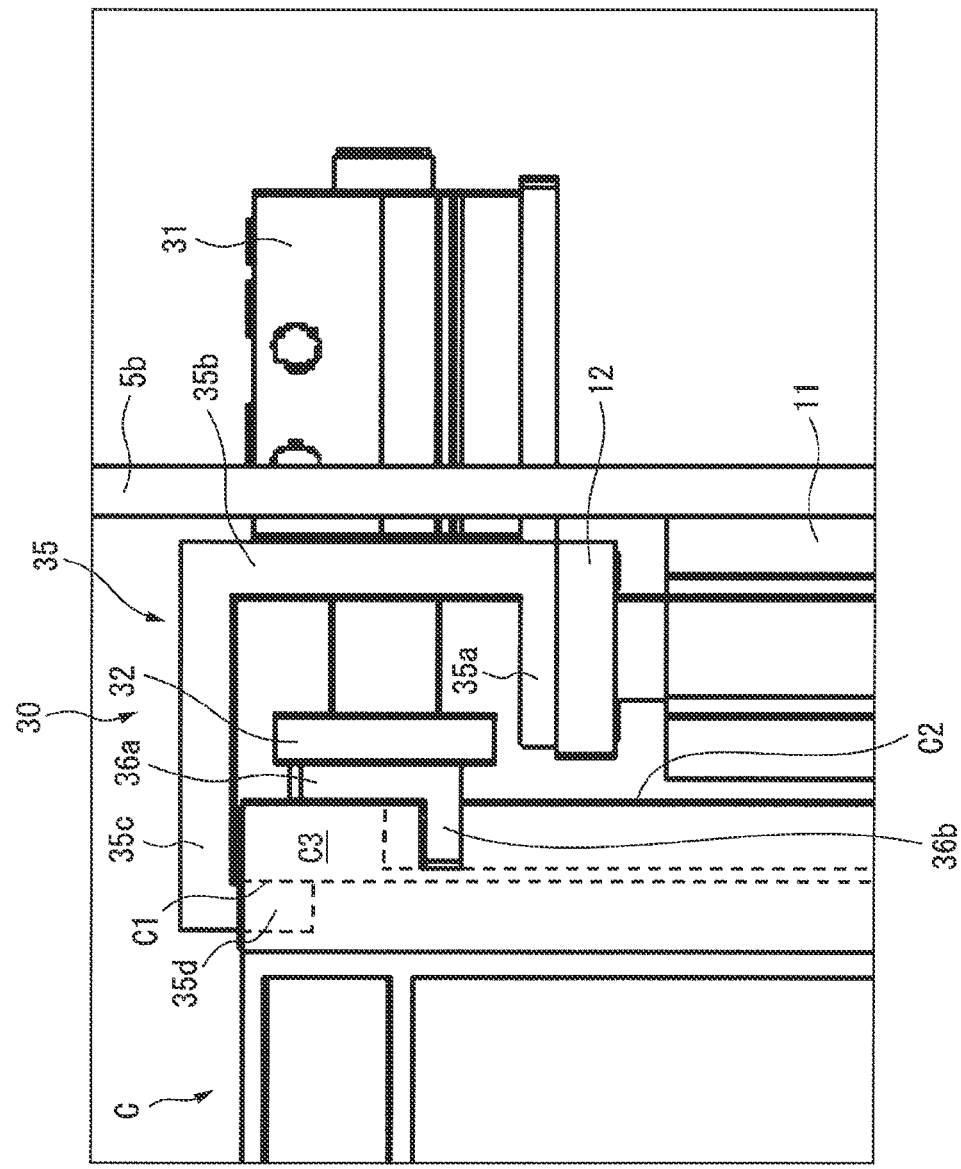
FIG. 2B is another partial enlarged view of a holding unit in FIG. 1.

In such a state, as illustrated in FIG. 2B, the second portion 36b is not in touch with the bottom surface of the flange unit C3. However, most part of the first portion 36a of the second holding member 36 is engaged with the outer surface C2 of the container C. Meanwhile, the fourth portion 35d of the first holding member 35 remains engaged with the inner surface C1 of the container C.

Accordingly, the flange unit C3 of the container C is held between the fourth portion 35d of the first holding member 35 and the first portion 36a of the second holding member 36. Therefore, even when there is a gap between the bottom surface of the flange unit C3 and the second portion 36b of the second holding member 36, the holding unit 30 can hold the container C.

As a matter of course, after the first portion 36a of the second holding member 36 is engaged with the outer surface C2 of the container C, the first slide unit 12 may be raised a little along the first slide base unit 11 to engage the second portion 36b of the second holding member 36 with the bottom surface of the flange unit C3. In this case, since the second portion 36b supports the bottom surface of the flange unit C3, the container C can be surely held. This process may be omitted.

Then, in step S12, whether the container C can be held or not is determined. This determination is made based on the position of the third slide unit 32 or the second holding member 36 which is detected by a position sensor (not illustrated). Specifically, when the position of the third slide unit 32 or the second holding member 36 is as illustrated in FIG. 2B, it is determined that the container C can be held. If it is determined that the container C cannot be held, the robot returns to step S11 to repeat the process until the container C is held.

Then, in step S13, as illustrated in FIG. 4, the first slide unit 12 is further raised along the first slide base unit 11. Thus, the holding unit 30 is raised together with the container C, and the container C is separated from the floor unit L (see FIG. 5). The bottom surface of the container C is raised a predetermined distance from the floor unit L, the robot proceeds to step S14.

In step S14, as illustrated in FIG. 5, the second slide unit 22 is moved along the second slide base unit 21 toward the container C. Thus, the receiving unit 40 which is integral with the second slide unit 22 is inserted between the bottom surface of the container C and the floor unit L (see FIG. 6). The container C is thus supported by the receiving unit 40.

Then, in step S15, the robot 1 is operated to move the container C from the floor unit L. When the container C is stacked on another container (not illustrated), only the container C is taken out.

Figure 7:
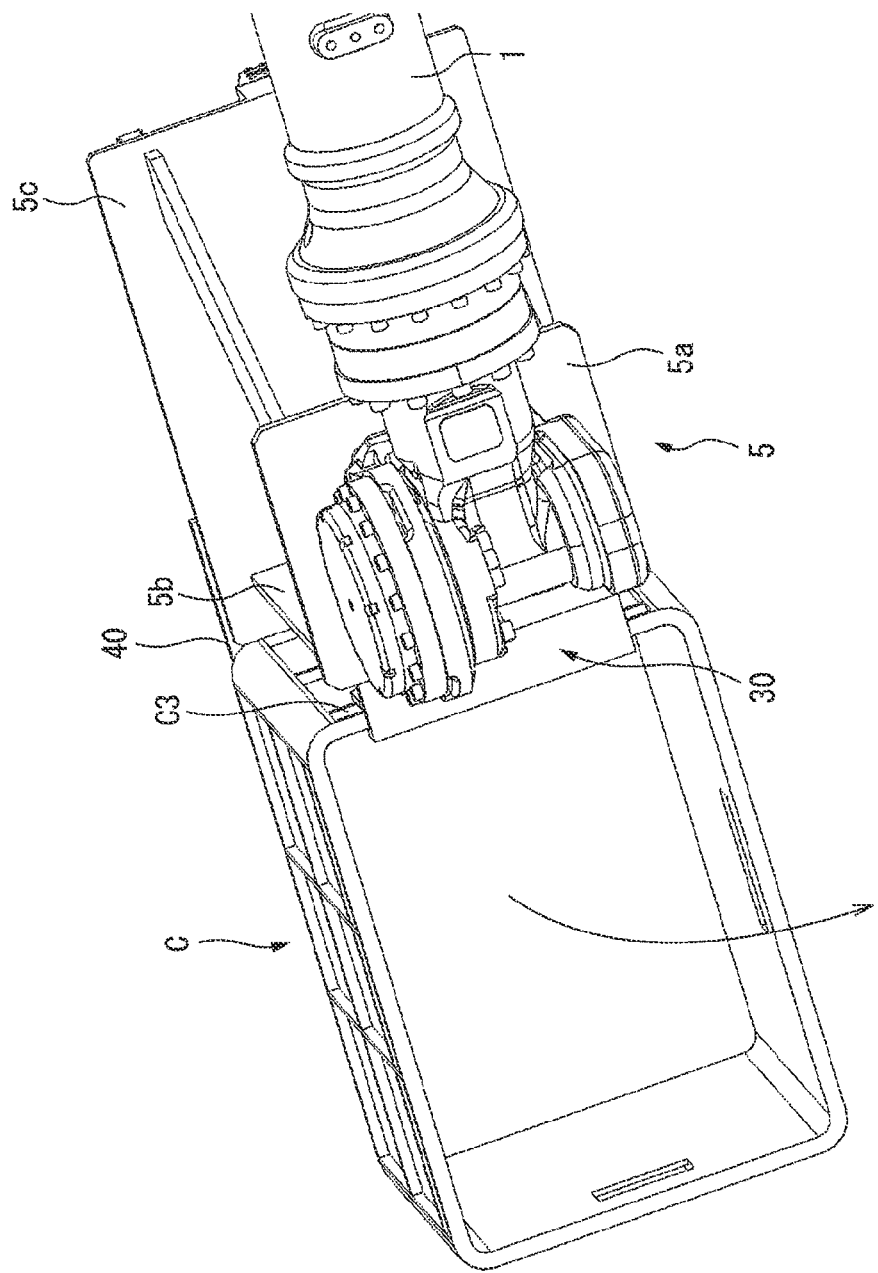
FIG. 7 is a perspective view illustrating a discharging operation of a container-carrying device.

Then, in step S16, the robot 1 is operated to tilt the container C. In the present invention, the container C is held by the holding unit 30 and the receiving unit 40. Therefore, even when the container C is tilted, a cargo in the container C can be discharged without dropping or damaging the container C (see FIG. 7).

In particular, as can be seen from FIG. 1 or the like, in the present invention, the base unit 5 and a member attached to the base unit 5 are arranged outside or below one side of the container C. In other words, the opening of the container C is not closed by the holding unit 30 or the like. For this reason, a cargo in the container C can be easily discharged by tilting the container C. Finally, in step S17, the vacant container C is arranged on the floor unit L or stacked on another container (not illustrated).

As mentioned above, in the present invention, after moving the holding unit 30 which has held only the upper end of one side of the container C upward by the first slide unit 12, the receiving unit 40 is inserted below the bottom surface of the container C. For this reason, if one side of the container C is open, the container C can be held and carried even when a plurality of such containers are arranged close to each other. Therefore, containers C close to each other can be loaded and unloaded.

In the present invention, a part of the holding unit 30 or the like does not protrude beyond both sides of the container C. Therefore, even when there is only a minimum gap equivalent to the width of the container C, the container C can be inserted in such a gap. Therefore, in the present invention, such containers C can be stacked up close to each other.

Figure 8:
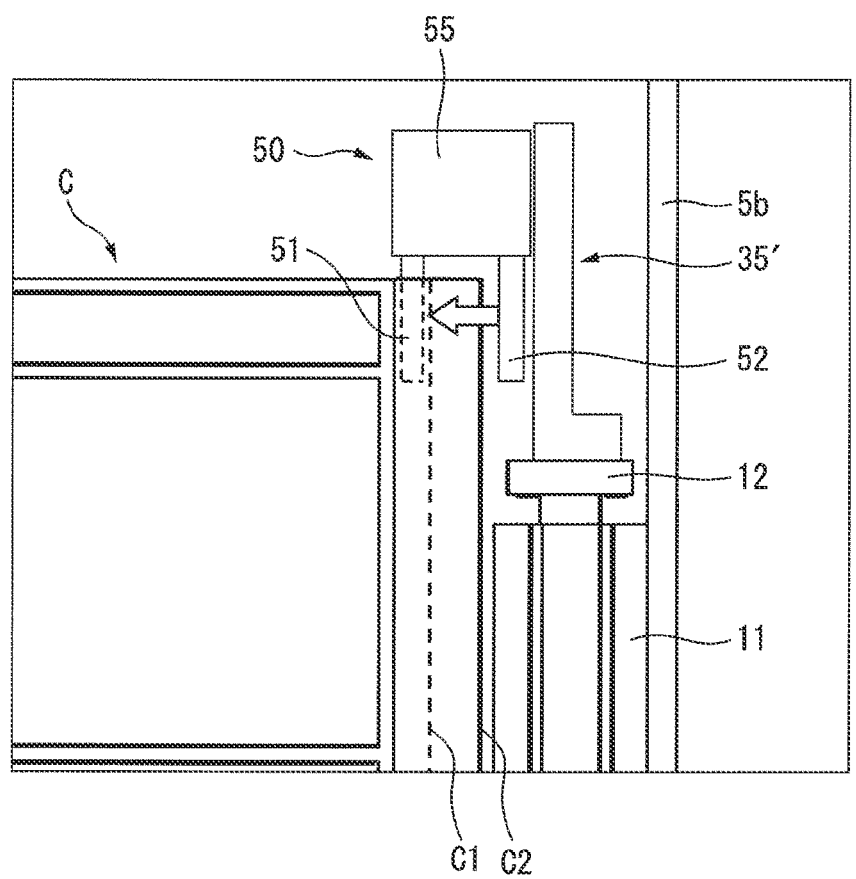
FIG. 8 is a partial enlarged view of another holding unit.

FIG. 8 is a partial enlarged view of another holding unit. In FIG. 8, a substantially L-shaped block 35' is arranged on the tip of the first slide unit 12. On the side of the block 35', a holding unit 50 in a form different from that of the holding unit 30 is provided. The block 35' may be a cuboid, and alternatively, the holding unit 50 may be directly attached to the first slide unit 12 without using the block 35'.

The holding unit 50 illustrated in FIG. 8 comprises: a fixed finger unit 51 extending downward from a body 55; and a movable finger unit 52 in parallel to the fixed finger unit 51.

First, the movable finger unit 52 is separated from the fixed finger unit 51 so that the distance between the fixed finger unit 51 and the movable finger unit 52 is not smaller than the thickness of the container C. Then, the robot 1 is operated to make the upper end of one side of the container C arranged between the fixed finger unit 51 and the movable finger unit 52.

Then, the movable finger unit 52 is moved toward the fixed finger unit 51, and the container is held between the fixed finger unit 51 and the movable finger unit 52. Thus, the container C can be held. In this case, since the thickness portion of the container C is held by friction, the container C needs not be provided with the flange unit C3. In other words, the holding unit 50 can hold the container C which is not provided with the flange unit C3.

Since the container C is configured to be held by friction in FIG. 8, a relatively large force is required. In contrast, when the bottom surface of the flange unit C3 is supported by the holding unit 30 as illustrated in FIG. 2A, the container C can be held by a relatively small force.

ADVANTAGEOUS EFFECT OF INVENTION

In the first embodiment, after moving a holding unit which has held only the upper end of one side unit of a container upward by a first slide unit, a receiving unit is inserted below the bottom surface of the container. For this reason, if one side of a container is open, the container can be held and carried even when a plurality of such containers are arranged close to each other. Therefore, containers arranged close to each other can be loaded and unloaded. Also, containers can be stacked up close to each other.

In the second and third embodiments, since a container is held by friction, the container needs not comprise a flange unit. The container can thus be held regardless of the shape of the container.

In the fourth embodiment, since the protruding unit of the second holding member supports the bottom surface of a jaw unit of a container, the container can be held by a smaller force than that in cases in which a container is held by friction.

In the fifth embodiment, since elements of the container-carrying device other than the holding unit are arranged outside or below the side of the container, the top of the container is open. For this reason, cargos in the container can be discharged by tilting the container by a robot.

While the present invention is described using the typical embodiments, it will be understood by those skilled in the art that the above-described changes and other various changes, omissions, and additions can be made without departing from the scope of the present invention.

What is claimed is:

1. A container-carrying device carrying a top-open box container, comprising:
   a robot;
   a base plate attached to an arm tip of the robot;
   a first slide base unit extending in the vertical direction which is attached to one side unit, which is perpendicular to the base plate;
   a first slide unit slidable along the first slide base unit;
   a holding unit which is attached to the first slide unit and which holds the upper end of one side of the container;
   a second slide base unit which is attached to another side unit, which is in parallel to the bottom surface of the container, and which extends perpendicular to the first slide base unit, the other side unit is perpendicular to the one side unit and is in parallel to the base plate;
   a second slide unit slidable along the second slide base unit; and
   a receiving unit which is attached to the second slide unit and which receives the bottom surface of the container, wherein the robot is operated to position the holding unit at the upper end of one side of the container so that the holding unit holds the upper end, the first slide unit is made to slide upward along the first slide base unit to raise the container, and the second slide unit is made to slide along the second slide base unit to insert the receiving unit below the bottom of the container, thereby taking out the container.

2. The container-carrying device according to claim 1, wherein the holding unit holds the container by pinching the inner surface and the outer surface thereof by friction.

3. The container-carrying device according to claim 1, wherein the holding unit comprises:

a first holding member which is attached to the first slide unit and which extends to be engaged with the inner surface of the container;

a third slide base unit which is attached to the first slide unit or the first holding member and which extends perpendicular to the first slide base unit;

a third slide unit slidable along the third slide base unit; and a second holding member which is attached to the third slide unit to be engaged with the outer surface of the container, wherein, after the first holding member is engaged with the inner surface of the container, the third slide unit is made to slide along the third slide base unit to engage the second holding member with the outer surface of the container, thereby holding the container.

4. The container-carrying device according to claim 3, wherein a flange unit is formed on the upper end of the one side of the container, the second holding member comprises a protruding unit protruding frontward, after the second holding member is engaged with the outer surface of the container, the first slide unit is made to slide upward along the first slide base unit, whereby the protruding unit of the second holding member supports the bottom surface of the flange unit.

5. The container-carrying device according to claim 1, wherein the robot, the base unit, the first slide base plate, the first slide unit, the second slide base unit, the second slide unit, and the receiving unit are arranged outside or below the one side of the container.

* * * * *